United States Patent [19]

McClure et al.

[11] Patent Number: 5,172,521

[45] Date of Patent: Dec. 22, 1992

[54] SHARPENING APPARATUS FOR FORAGE HARVESTER KNIVES

[75] Inventors: John R. McClure; Larry D. Hall, both of New Holland, Pa.

[73] Assignee: Ford New Holland, Inc., New Holland, Pa.

[21] Appl. No.: 652,782

[22] Filed: Feb. 8, 1991

[51] Int. Cl.⁵ ............................................. B24B 3/55
[52] U.S. Cl. .................................. 51/57; 51/246; 51/252; 76/82.1
[58] Field of Search ............... 51/57, 56 R, 246, 249, 51/252, 59 R; 76/82.1

[56] References Cited

U.S. PATENT DOCUMENTS

| | | | |
|---|---|---|---|
| 1,834,034 | 12/1931 | Norton et al. | 51/246 |
| 2,193,854 | 3/1940 | Benedict | 51/56 |
| 2,735,248 | 2/1956 | West et al. | 51/246 |
| 2,788,623 | 4/1957 | Procter | 51/246 |
| 3,059,383 | 10/1962 | Wallin et al. | 51/246 |
| 3,546,818 | 12/1970 | Beck | 51/56 |
| 3,677,316 | 7/1972 | Markham | 146/242 |
| 3,863,403 | 2/1975 | Fleming | 51/249 |
| 4,321,773 | 3/1982 | Fleming | 51/249 |

Primary Examiner—Robert A. Rose
Attorney, Agent, or Firm—Shlesinger, Arkwright & Garvey

[57] ABSTRACT

A sharpening apparatus is disclosed for a plurality of knives disposed in a cutterhead generating a cylindrical periphery when rotating. The apparatus comprises a grinding stone; a carriage for carrying the grinding stone in a grinding mode across the cutterhead in a line generally parallel to the axis of rotation of the cutterhead; a drive coupled to said carriage for effecting reciprocatory movement of the carriage; and means for applying constant pressure on the knives by the grinding stone during grinding operations such that the cutterhead retains its cylindrical periphery after repeated sharpening operations.

14 Claims, 6 Drawing Sheets

SHARPENING APPARATUS FOR FORAGE HARVESTER KNIVES

FIELD OF THE INVENTION

The present invention relates generally to a forage harvester with a rotating cutterhead and more particularly to an automatic sharpening or grinding apparatus for the knives of the cutterhead.

BACKGROUND OF THE INVENTION

A sharpening apparatus for forage harvester knives is disclosed in McClure et al, U.S. Pat. No. 4,834,303. McClure discloses a forage harvester with a rotating cutterhead and an automatic grinding mechanism for the knives of the cutterhead, where the grinding mechanism comprises a carriage carrying a grinding stone and is reciprocated back and forth across the cutterhead while the cutterhead is rotating. A shearbar is used in conjunction with the cutterhead.

Weaver, Jr. et al, U.S. Pat. No. 4,799,625, discloses a method and apparatus for adjusting a shearbar relative to a cutterhead. It has been found that the sharpening apparatus of McClure produces a barrel-shaped cutterhead profile over a period of time, which profile has been found incompatible with the shearbar adjusting apparatus of Weaver, Jr. et al. The apparatus of Weaver depends on contacting the two opposite corners of the rotating cutterhead to make the proper adjustment on the shearbar relative to the cutterhead profile. With a barrel-shaped cutterhead profile, it has been found that the apparatus of Weaver is contacting one corner and an intermediate portion of the cutterhead, instead of the opposite corner. The effect is that the shearbar, instead of being adjusted parallel and close to the cutterhead, is adjusted at an angle to the cutterhead, producing a gap along a substantial portion of the shearbar relative to the cutterhead. This gap is undesirable, since it causes the crop being harvested to be torn and shredded, requiring greater power and reducing the efficiency of the machinery.

The present invention is therefore directed to providing a solution to the above-identified problem.

OBJECTS AND SUMMARY OF THE INVENTION

It is therefore an object of the present invention to provide a sharpening apparatus for forage harvester cutterhead knives that maintains the cutterhead profile in a substantially cylindrical shape even after numerous sharpening operations.

It is another object of the present invention to provide a sharpening apparatus for forage harvester cutterhead knives that permits an automatic shearbar adjusting apparatus, such as disclosed in Weaver, Jr. et al, which is cited above, to perform more accurately and reliably.

It is yet another object of the present invention to provide a sharpening apparatus for forage harvester knives that maintains the substantially cylindrical shaped profile of the cutterhead, thereby permitting accurate adjustment of the shearbar to the cutterhead for greater cutting efficiency.

It is still another object of the present invention to provide a sharpening apparatus for forage harvester cutterhead knives that includes a guideway that corrects the path of a grinding stone as it moves longitudinally along the cutterhead during sharpening operations such that the substantially cylindrical shaped profile of the cutterhead is maintained, avoiding the barrel shaped profile produced by prior art apparatus.

It is yet another object of the present invention to provide a sharpening apparatus for forage harvester cutterhead knives that has a preformed guideway for a grinding stone that is relatively inexpensive to manufacture, install and maintain.

It is an object of the present invention to provide a sharpening apparatus for forage harvester cutterhead knives that has a guideway for a grinding stone that compensates for the bowing tendency of the intermediate portion of the guideway during sharpening operation, thereby providing a substantially uniform cutting edge along the cutterhead knives.

In summary, the present invention provides a sharpening apparatus for forage harvester cutterhead knives that maintains the cutterhead profile in a substantially cylindrical shape even after numerous sharpening operations, thereby permitting greater accuracy and reliability when automatically adjusting a shearbar relative to the cutterhead.

These and other objects of the present invention will become apparent from the following detailed description.

BRIEF DESCRIPTIONS OF THE DRAWINGS

DETAILED DESCRIPTION OF THE INVENTION

Figure 1:
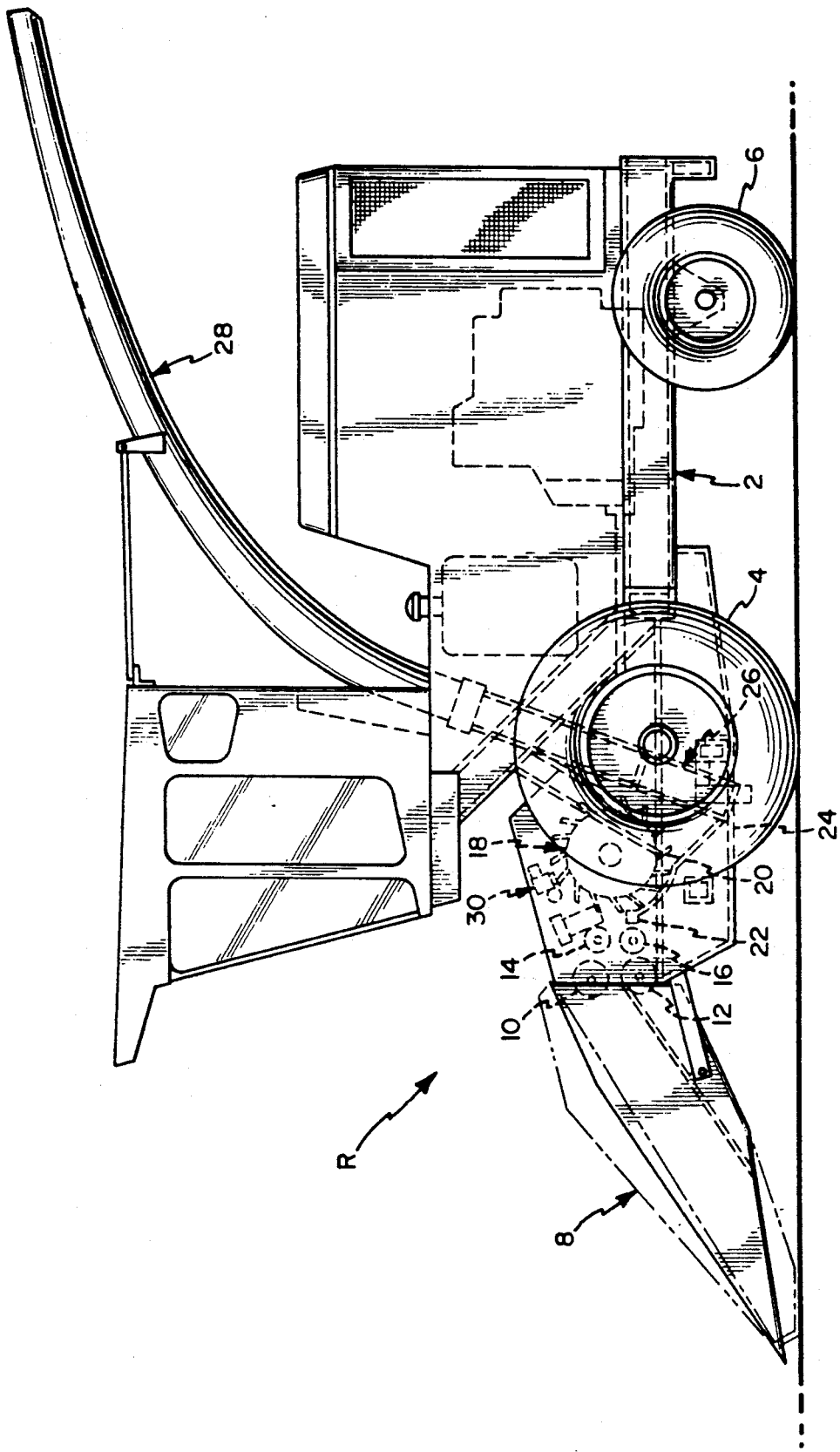
FIG. 1 is a schematic side elevational view of a forage harvester including a sharpening apparatus for the cutterhead.
Figure 2:
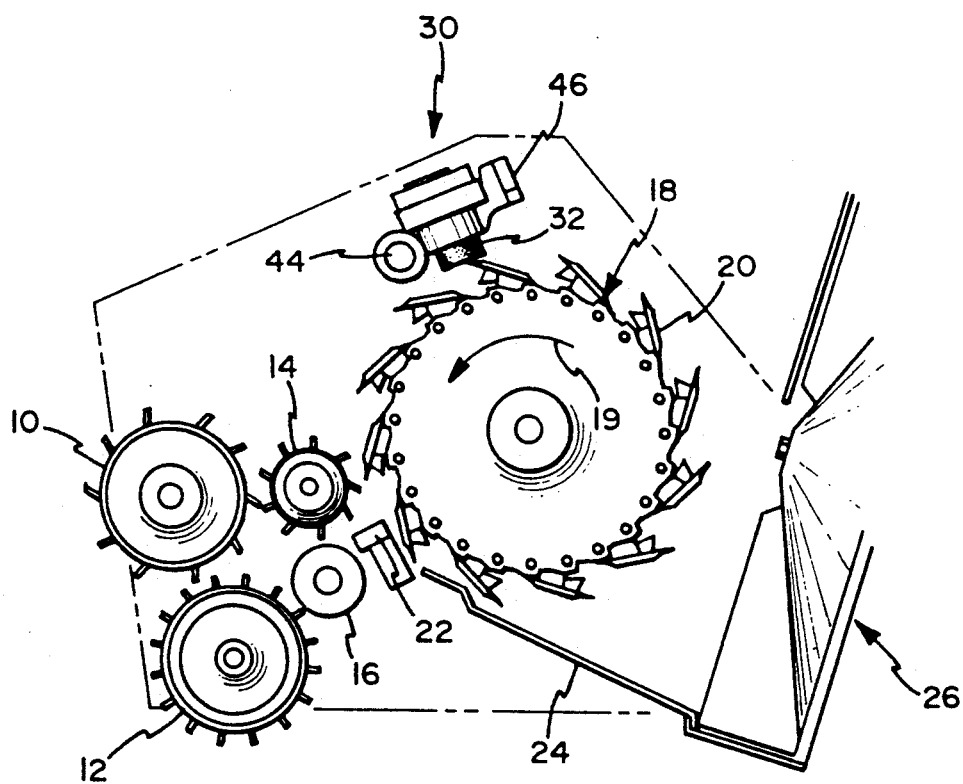
FIG. 2 is an enlarged view of a detail relative to the sharpening apparatus and the cutterhead shown in FIG. 1.

A forage harvester R utilizing the present invention is disclosed in FIG. 1 and comprises a main frame 2 on which are mounted ground engaging wheels 4 and 6. The forage harvester R is shown equipped with a row crop attachment 8 (shown in dashed lines) which could be replaced with a conventional windrow pick-up device or a conventional cutter bar attachment, depending on the crop to be harvested. The forage harvester R includes upper and lower forward feed rolls 10 and 12, respectively, and upper and lower rear feed rolls 14 and 16, respectively, as best shown in FIGS. 1 and 2, that operate to feed crop material from the attachment 8 into a cutterhead 18 rotating in the direction generally indicated at 19. The cutterhead 18 generates a substantially cylindrical peripheral shape or profile when rotating. The cutterhead 18 comprises a plurality of knives 20 that cooperate with a fixed shearbar 22 fitted on the lower edge of an inlet opening in a cutterhead housing 24, as best shown in FIG. 2. The outlet of the cutterhead housing 24 communicates with an inlet of a blower 26, the outlet of which is fitted with a normal discharge spout 28, which can be positioned by an operator to direct the cut crop material as required, normally into a wagon which is moving along side the harvester R or, in some instances, pulled behind the harvester.

Figure 3:
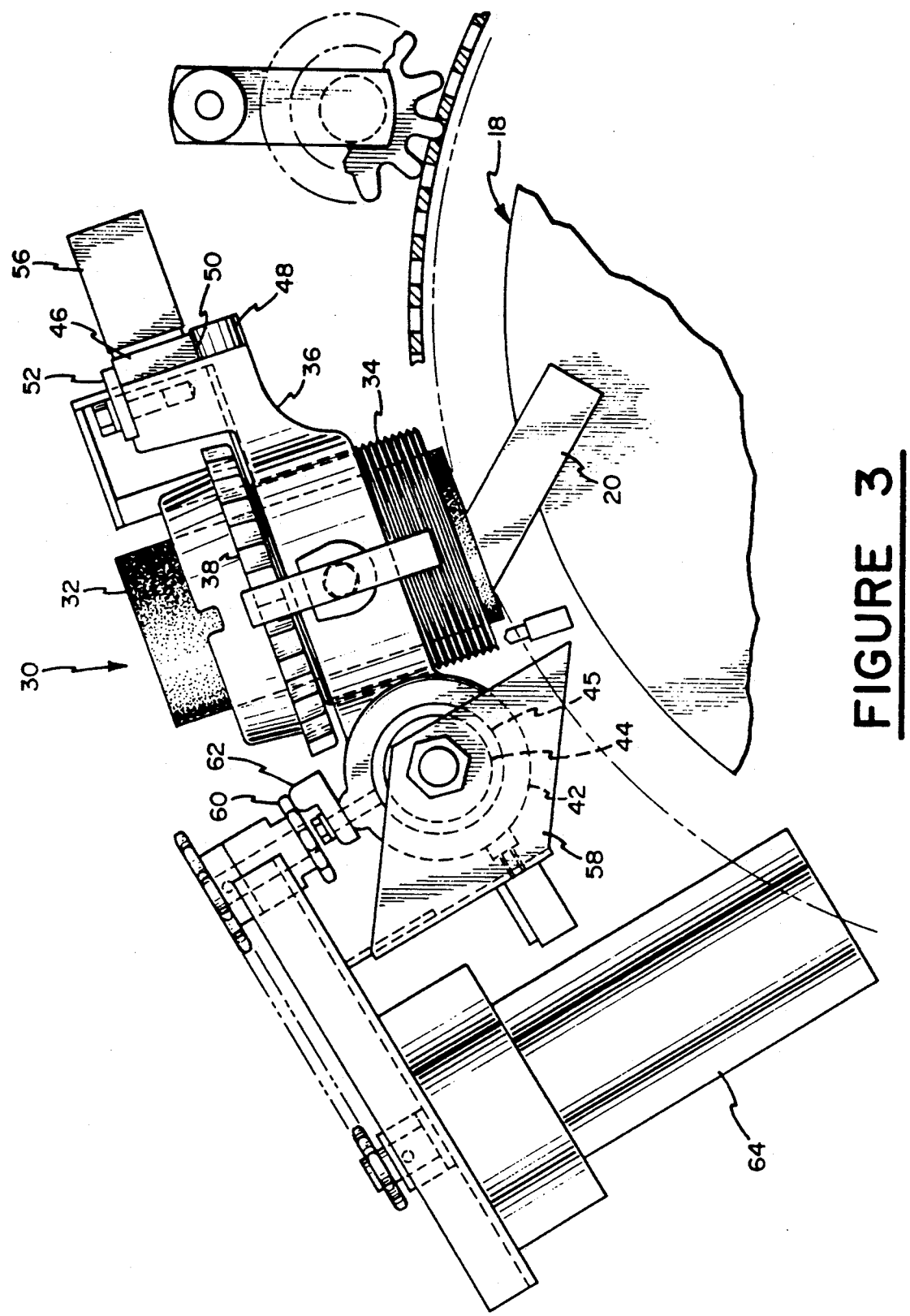
FIG. 3 is an enlarged side elevational view of the sharpening apparatus for the cutterhead shown in FIG. 2.

The cutterhead 18 is fitted with a knife grinding or sharpening mechanism 30, similar to that disclosed in McClure et al, U.S. Pat. No. 4,834,303, cited above and incorporated herein by reference. The sharpening mechanism 30 comprises a solid cylindrical grinding stone 32 that is adjustably mounted within an externally threaded barrel 34, as best shown in FIG. 3. A similarly threaded aperture in a carriage 36 carries the barrel 34. The upper end of the barrel 34 has a tooth indexing ring 38 that cooperates with a trip member 40, as best shown in FIG. 4.

Figure 4:
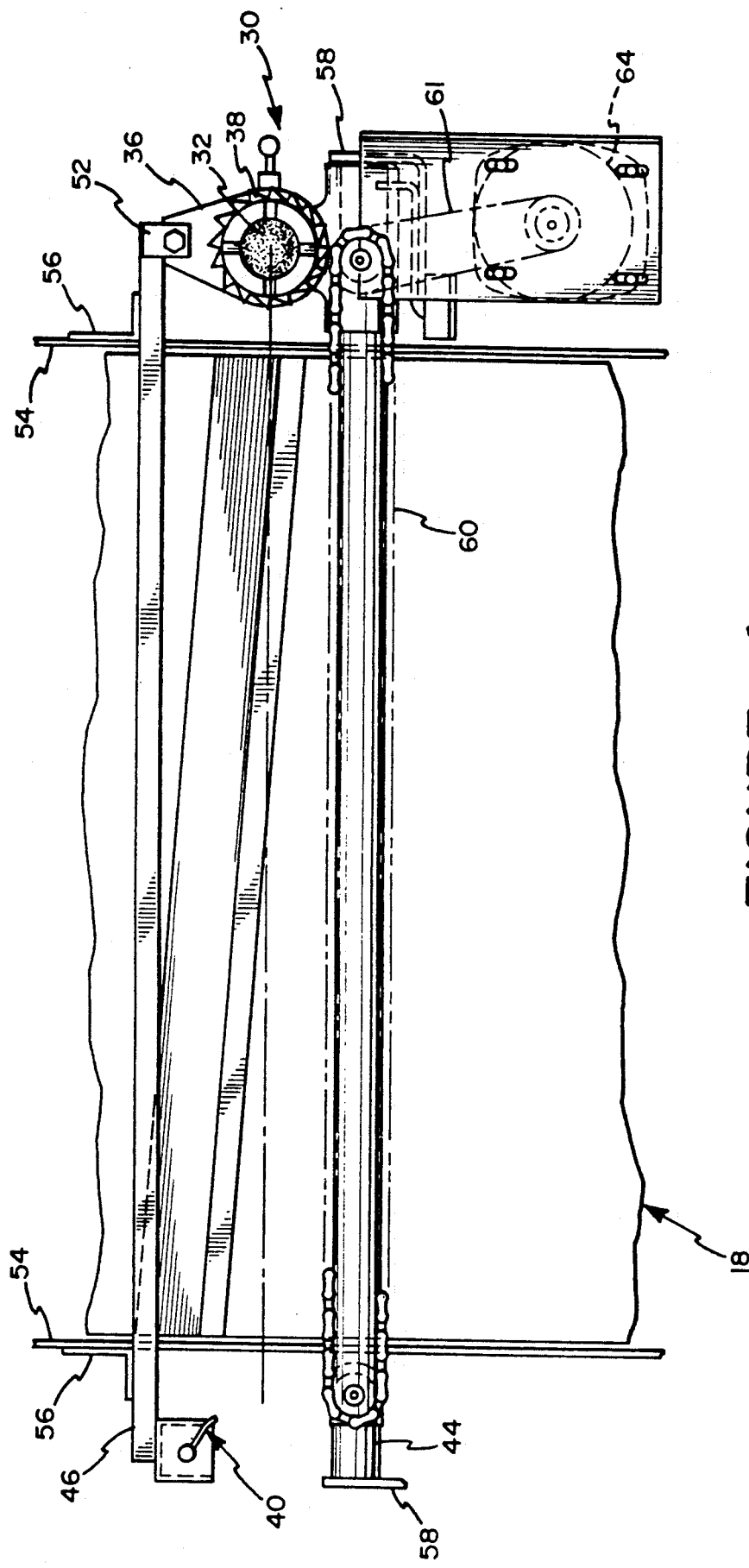
FIG. 4 is a top view of the sharpening apparatus shown in FIG. 3.

The carriage 36, when not in use, is normally parked as shown in FIG. 4. In operation, the carriage 36 carries the stone 32 in a back and forth cycle longitudinally along the cutterhead 18 while the stone 32 is in engagement of the cutting edges of the knives 20, as best shown in FIGS. 3 and 4. The stone 32 leaves the cutterhead 18 at each end of its cycle. The trip member 40 engages the indexing ring 38 on every cycle of the carriage 36, and the ring 38, and hence the barrel 34 is rotated one tooth width and thus, the stone 32 is moved downwardly by a small distance relative to the cutterhead 18, thereby compensating for wear of the stone 38 during the sharpening or grinding action on the previous cycle of the stone 32.

The carriage 36 has a collar 42, which slidably receives a straight guide rod 44 of circular cross-section via a bearing 45 that facilitates movement of the carriage 36 back and forth along the guide rod 44, as best shown in FIG. 3. A guide rail 46 of rectangular cross-section is provided and a roller 48 is provided on the carriage 36 to engage the underside 50 of the guide rail 46. The underside 50 is disposed next to the cutterhead 18, as best shown in FIG. 3. A guide plate 52 is provided on the carriage 36 and slidably engages the top of the guide rail 46. The guide rail 46 is mounted on side walls 54 of the cutterhead housing 24 by respective L-shaped brackets 56. The guide rod 44 is operably secured to the sidewalls 54 by brackets 58, as best shown in FIG. 4. The trip member 40 is secured to the guide rail 46 opposite to the park position of the carriage 36.

The carriage 36 is pulled back and forth across the cutterhead 18 by means of an endless chain 60 which is operably secured to the carriage 36 by means of a member 62, as best shown in FIGS. 3 and 4. A motor 64 drives the chain 60 via another chain 61.

Figure 5:
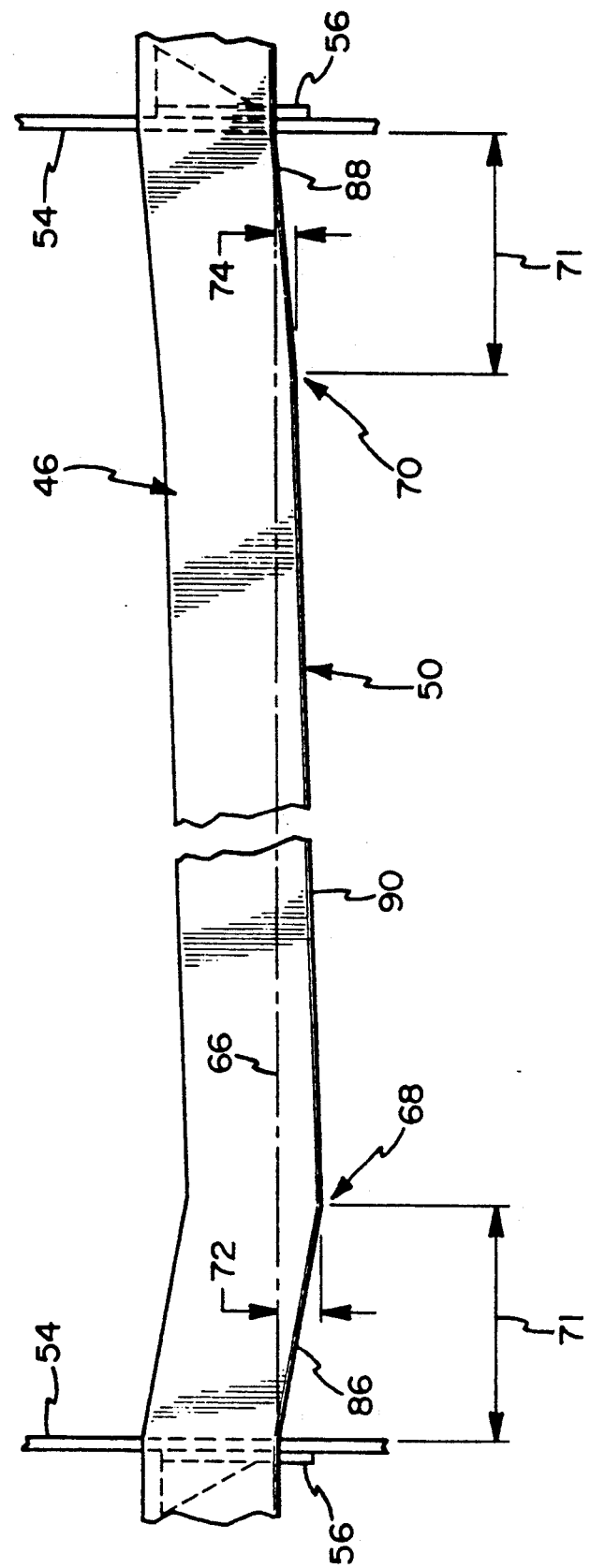
FIG. 5 is an enlarged detailed view of a guideway used in the sharpening apparatus showing in FIGS. 3 and 4.

The underside 50 of the guide rail 46 is slightly bowed downwardly toward the cutterhead 18, in the range of 0.30 to 0.80 mm relative to a reference line 66, as best shown in FIG. 5. The reference line 66 is disposed parallel to the axis of rotation of the cutterhead 18. Points 68 and 70 on the underside 50 are disposed generally equidistantly from the respective sidewalls 54, preferably by an amount 71 substantially equal to 76 mm. Point 68 is disposed further below the reference line 66 than the point 70, at a distance 72 substantially in the range of 0.50–0.70 mm. Point 70 is disposed at a distance 74 substantially in the range of 0.30–0.50 mm.

The distance 72 is larger than the distance 74 to compensate for the action of the grinding stone 32 during its travel back and forth across the cutterhead 18. Since the carriage 36 is normally parked on the side adjacent the drive motor 64 and the stone 32 is indexed or advanced radially on the opposite end of the guide rail 46, as best shown in FIG. 4, the operative surface of the stone 32 will have traveled twice the length of the cutterhead 18 before it is indexed. Thus, the larger distance 72 compensates for the action of the stone 32 near the indexing end of the guide rail 46.

Although the forage harvester R is disclosed as having a straight guide rod 44 and a bowed guide rail 46, it should be understood to a person of ordinary skill in the art that the guide rod 44 may also be configured to provide the similarly shaped guide edge 50 as provided by the guide rail 46, thereby providing two bowed guide members for the carriage 36 instead of one.

Figure 6:
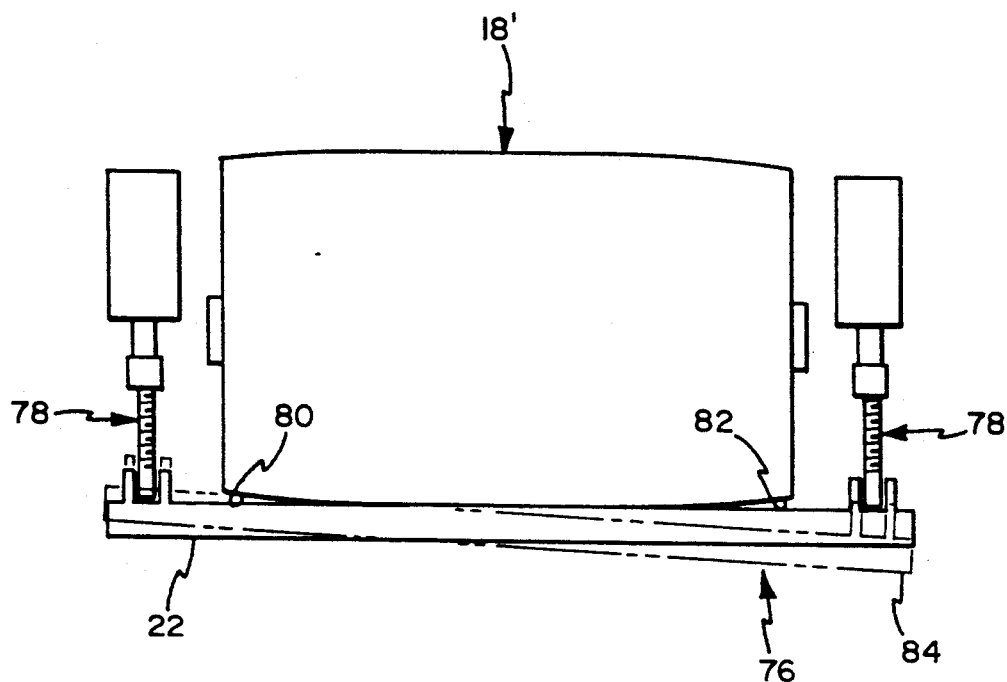
FIG. 6 is a schematic top view of a cutterhead and a shearbar adjusting apparatus, showing a barrel-shaped cutterhead profile after numerous sharpening operations provided by a prior art sharpening apparatus.
Figure 7:
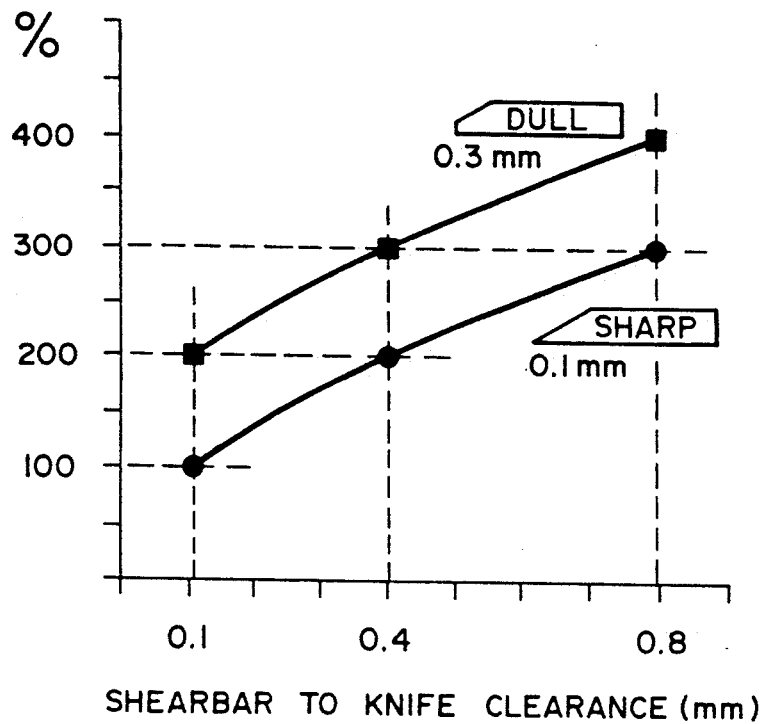
FIG. 7 is a graph of the amount of energy required relative to the sharpness of the cutterhead and the distance between the cutterhead and the shearbar.

A shearbar adjusting apparatus 76 is shown schematically in FIG. 6 and is fully described in Weaver, Jr., U.S. Pat. No. 4,799,625, as cited above. The shearbar 22 is adjusted relative to the cutterhead 18 by means of screw drives 78, each of which is disposed at respective ends of the shearbar 22. The sharpening apparatus of the prior art, such as disclosed in McClure cited above, produces a barrel-shaped cutterhead profile 18' after several sharpening operations. The shearbar adjusting apparatus 76, which depends on contacting the corner points 80 and 82 of the cutterhead 18 for proper adjustment, does not work properly with the barrel-shaped cutterhead profile 18'. The shearbar 22, instead of being adjusted parallel to the cutterhead 18, assumes a skewed position, as best shown in dashed lines in FIG. 6. The shearbar 22 in the skewed position 84 will provide less cutting efficiency in the area of the corner of 82, since the shearbar is further away from the cutterhead 18 at that location than in the vicinity of the corner 80. This is clearly illustrated in FIG. 7, where energy required for cutting increases as the shearbar to knife clearance increases. For example, a shearbar set at 0.4 mm from the knives doubles the power consumption needed for cutting in comparison with a setting of 0.1 mm.

The barrel shaped profile 18' which the cutterhead 18 assumes after several sharpening operations may be explained by the fact that the stone 32, when it engages each corner of the cutterhead, imposes greater pressure on the knives of the cutterhead 18, since only a portion of the operative surface of the grinding stone is in contact with the knives at those points. Coupled with the increased pressure is the fact that the guide rod 44 and a straight guide rails (not shown but similar to guide rail 46 with a straight underside) have greater resistance to bending near the corner portions of the cutterhead 18, since they are closer to their respective support brackets than at their center portions. Once the stone is completely disposed over the cutterhead 18, the pressure on the stone is then reduced, since the entire operative surface of the stone is available to distribute the force present and exerted between the stone and the knives. Also, the guide rod 44 and straight guide rail deflect more at their center portions than at their end portions.

Figure 8:
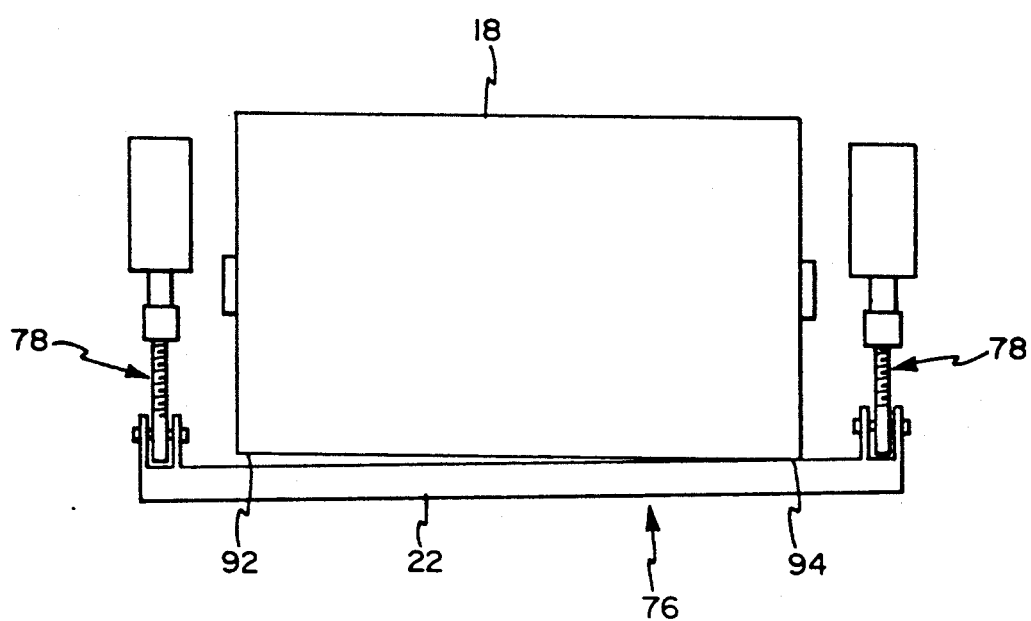
FIG. 8 is a schematic top view of a cutterhead utilizing the sharpening apparatus of the present invention and a shearbar adjusting apparatus.

To counteract and compensate for the tendency of the prior art sharpening apparatus to produce a barrel-shaped cutterhead profile 18', the present invention provides the guide rail 46 with a shape as disclosed in FIG. 5. The underside 50 of the guide rail 46 has a bowed shaped, with sloping portions 86 and 88 at each end near the support brackets 56 and a straight central portion 90 which is below the reference line 66. The net effect of the shape of the guide rail 46 is to maintain the cutterhead 18 to its substantially cylindrical shape even after numerous sharpening operations, as best shown in FIG. 8. In operation, the roller 48 remains in contact with the underside 50 at all times. As the stone 32 enters the cutterhead 18, the stone 32 is lowered gradually into the cutterhead 18 by the slope portion 88 of the rail 46 until the stone 32 fully engages the knives 20. Subsequently, the stone 32 travels axially across the cutterhead 18 until the stone 32 starts to come off the knives 20. At that point, the stone 32 is gradually raised off the knives 20 by the slope portion 86.

With the present invention producing a truer straight line cutting shape for the cutterhead 18, the shearbar adjusting apparatus 76 thereby achieves closer shearbar to knife settings. The corners 92 and 94 becomes available as reference points for adjusting the shearbar 22 toward the cutterhead 18, as fully described in Weaver, Jr., cited above.

While this invention has been described as having preferred design, it is understood that it is capable of further modification, uses and/or adaptations, following in general the principle of the invention and including such departures from the present disclosure as come within known or customary practice in the art to which the invention pertains, and as may be applied to the essential features set forth, and fall within the scope of the invention or the limits of the appended claims.

We claim:

1. A sharpening apparatus for a plurality of knives disposed in a cutterhead generating a cylindrical periphery when rotating, said apparatus comprising:
   (a) means for grinding the knives when the cutterhead is rotating;
   (b) a guide member for carrying said grinding means in a grinding mode across the cutterhead, said grinding means translating a line generally parallel to the axis of rotation of the cutterhead, said guide member being disposed generally parallel to the axis of rotation of said cutterhead;
   (c) said guide member including a guide edge having first and second end portions and central portion, said central portion being disposed closer to the cutterhead than said first and second end portions; and
   (d) the cutterhead having first and second ends, said guide edge including first and second points disposed generally equidistant from the cutterhead first and second ends, said first point being closer to the cutterhead than said second point.

2. A sharpening apparatus for a plurality of knives disposed in a cutterhead generating a cylindrical periphery when rotating, said apparatus comprising:
   (a) means for grinding the knives when the cutterhead is rotating;
   (b) a guide ember for carrying said grinding means in a grinding mode across the cutterhead, said grinding means translating a line generally parallel to the axis of rotation of the cutterhead, said guide member being disposed generally parallel to the axis of rotation of said cutterhead; and
   (c) said guide member including a guide edge having a straight central portion and sloping first and second end portions, said central portion being disposed closer to the cutterhead than said first and second end portions.

3. A sharpening apparatus for a plurality of knives disposed in a cutterhead generating a cylindrical periphery when rotating, said apparatus comprising:
   (a) means for grinding the knives when the cutterhead is rotating;
   (b) a carriage for carrying said grinding means in a grinding mode across the cutterhead, said grinding means translating a line generally parallel to the axis of rotation of the cutterhead;
   (c) drive means coupled to said carriage for effecting reciprocatory movement of said carriage;
   (d) said carriage including first and second guide members disposed generally parallel to the axis of rotation of said cutterhead;
   (e) one of said first and second guide members including a guide edge having first and second end portions and central portion, said central portion being disposed closer to the cutterhead than said first and second end portions; and
   (f) the cutterhead including first and second ends, said guide edge including first and second points generally equidistant from the cutterhead first and second ends, said first point being closer to the cutterhead than said second point.

4. A sharpening apparatus as in claim 3, and further comprising:
   (a) indexing means for advancing said grinding means radially toward the cutterhead after a number of passes on the cutterhead;
   (b) said indexing means includes a trip member disposed at one end of one of said first and second guide members; and
   (c) said first point is adjacent said trip member.

5. A sharpening apparatus as in claim 3, wherein:
   (a) said first guide member includes said guide edge; and
   (b) said first guide member has a rectangular cross-section.

6. A sharpening apparatus as in claim 5, wherein:
   (a) said first guide member is upstream of said second guide member in the normal direction of rotation of said cutterhead.

7. A cutting apparatus for a forage harvester, comprising:
   (a) a rotatable cutterhead having a plurality of knives, said knives including cutting edges generating a cylindrical periphery when said cutterhead is rotating;
   (b) means for grinding said knives when said cutterhead is rotating;
   (c) a carriage for carrying said grinding means in a grinding mode across said cutterhead, said grinding means translating a line on said cutterhead generally parallel to the axis of rotation of said cutterhead;
   (d) drive means coupled to said carriage for effecting reciprocatory movement of said carriage;
   (e) said carriage including a first guide member disposed generally parallel to the axis of rotation of cutterhead; and
   (f) said first guide member including a guide edge having a straight central portion and sloping first and second end portions, said central portion being closer to said cutterhead than said first and second end portions.

8. A cutting apparatus as in claim 7, and further comprising:
(a) indexing means disposed for advancing said grinding means radially toward said cutterhead after a number of passes on the cutterhead; and
(b) said indexing means includes a trip member secured to one end of one said first guide member.

9. A cutting apparatus as in claim 7, wherein:
(a) said first guide member has a rectangular cross-section.

10. A cutting apparatus as in claim 7, wherein:
(a) said carriage includes a second guide member disposed substantially parallel to the axis of rotation of said cutterhead; and
(b) said first guide member is upstream of said second guide member in the normal direction of rotation of said cutterhead.

11. A cutting apparatus for a forage harvester, comprising:
(a) a rotatable cutterhead having a plurality of knives, said knives including cutting edges generating a cylindrical periphery when said cutterhead is rotating;
(b) means for grinding said knives when said cutterhead is rotating;
(c) a carriage for carrying said grinding means in a grinding mode across said cutterhead, said grinding means translating a line on said cutterhead generally parallel to the axis of rotation of said cutterhead;
(d) said carriage including first and second guide members disposed generally parallel to the axis of rotation of said cutterhead;
(e) drive means coupled to said carriage for effecting reciprocatory movement of said carriage;
(f) said first guide member including a guide edge disposed next to said cutterhead;
(g) said guide edge having first and second end portions and central portion, said central portion being disposed closer to said cutterhead than said first and second end portions; and
(h) said cutterhead including first and second ends, said guide edge including first and second points generally equidistant from said cutterhead first and second ends, said first point being closer to said cutterhead than said second point.

12. A cutting apparatus as in claim 11, wherein:
(a) said first guide member ha a rectangular cross-section.

13. A cutting apparatus as in claim 11, an further comprising:
(a) indexing means disposed for advancing said grinding means radially toward said cutterhead after a number of passes on said cutterhead;
(b) said indexing means includes a trip member secured to one end of said first guide member; and
(c) said first point is adjacent said trip member.

14. A cutting apparatus as in claim 11, wherein:
(a) said first guide member is upstream of said second guide member in the normal direction of rotation of said cutterhead.

* * * * *